UNITED STATES PATENT OFFICE.

WILLIAM H. DIBBLE, OF ELIZABETH, ASSIGNOR TO THE DIBBLE MANUFACTURING COMPANY, OF TRENTON, NEW JERSEY.

IMPROVEMENT IN PROCESSES OF MAKING COMPOSITION ARTICLES FROM BLOOD.

Specification forming part of Letters Patent No. 192,863, dated July 10, 1877; Reissue No. 8,305, dated June 25, 1878; application filed June 12, 1878.

*To all whom it may concern:*

Be it known that I, WILLIAM H. DIBBLE, of Elizabeth, in the county of Union and State of New Jersey, have invented a new and useful process for utilizing the blood of animals in the manufacture of compressed articles for various useful and ornamental purposes, which process is fully set forth in the following specification.

The object of this process is to utilize the blood of animals in the formation of certain articles by subjecting the blood to heat and pressure.

To this end, therefore, the process chiefly consists in first mixing the blood as obtained from the abattoir with certain pulverized materials in quantities about equal by weight to the weight of the blood used when dried, then drying or partially drying the mixture by either natural or artificial heat and finely pulverizing said mixture, and finally subjecting the powder so obtained to heavy pressure in molds or dies of any desired configuration heated to a temperature of from 200° to 500° Fahrenheit.

The proportions above given for the admixture with the blood of the substances intended for giving body to the blood are the best for articles most generally needed; but for the manufacture of different articles the proportions may be varied as follows: For the manufacture of some articles the composition need be only moistened with the blood before drying. Such articles, when finished by heat and pressure, will have either a woody or stone-like nature, depending upon the indurating or body-giving material which may be mixed with the blood, while those articles made with a liberal mixture of blood, or, indeed, from the dry powdered blood alone, will, in appearance, more nearly resemble hard rubber, although from pure blood alone there is not formed an article so strongly coherent and durable, nor of so hard a texture; and, while pure blood alone may be used, it requires admixture with other material to make hard, tough, and trustworthy articles for general use.

In this process the indurating or body-giving materials used may be either organic or inorganic, such as animal, vegetable, and mineral solids, any one or more of which powdered solids may be mixed with the fresh blood, as above described, or may be mixed with the blood when powdered, though the former method I consider the more preferable. Some of the substances chiefly employed in this process are wood-dust, vegetable or woody fiber, powdered bone or shells, powdered slate, and other powdered minerals and metallic powders, many of the latter affording excellent coloring matter.

The articles made by this process possess great hardness and durability, are possessed of a fine polish, and are of great use and value in the arts for many useful and decorative or ornamental purposes. Some of the articles which can be made to great advantage by this process are door-knobs, moldings, table-surfaces, chair-frames, mantels, wainscotings, statuettes, picture-frames, and jewelry-settings, and a great variety of ornamental figures.

For panelings and such work, sheets of paper may be prepared by either saturating said sheets with the wet mixture or with blood alone, and then compressing the dried sheet, or the sheet may form a foundation or inner layer covered by the dried blood powder, and the whole be compressed as above described.

In the articles made by this process may be inlaid, by compression in the dies, various materials or designs, adding much to their beauty and color; but inlaying and coloring, *per se*, I do not herein claim.

I am aware that pulverized mineral substances have heretofore been mixed with blood for making varnishes and veneers, which mixture, when set, has been used as a stock, from which to cold-punch or cut various articles to be afterward baked; but such process is not similar to mine, and such I do not claim.

I am also aware that both organic and inorganic substances have been pulverized and mixed and molded with albumen, size, glue, and other gelatinous or glutinous substances into articles of various forms; but I herein disclaim the use of albumen as such in my process. Although it may be present in the blood when used, yet it is not necessary to my process.

and I can use the blood as well after it has been deprived of its albumen as if the albumen were present.

In no other process known to me has the blood of animals, either alone or mixed with indurating or body-giving materials, been first dried and pulverized, and then subjected to pressure in heated dies or molds for the final and complete operation.

I therefore claim as of my invention—

The process of making compressed articles from the blood of animals herein described, consisting of first converting the blood into a dry mass or mixture by the treatment described, and then subjecting the mass so formed to great pressure in heated molds or dies of any desired configuration, substantially in manner and proportion as set forth.

WM. H. DIBBLE. [L. S.]

Witnesses:

C. E. TULLER,

W. F. YARD.